United States Patent
Jeong et al.

(10) Patent No.: US 11,142,472 B2
(45) Date of Patent: Oct. 12, 2021

(54) AQUIFER STORAGE AND RECOVERY SYSTEM USING NATURAL COAGULANT

(71) Applicant: KOREA INSTITUTE OF SCIENCE AND TECHNOLOGY, Seoul (KR)

(72) Inventors: Seong Pil Jeong, Seoul (KR); Kyungjin Cho, Seoul (KR); Jae Woo Choi, Seoul (KR); Seok Won Hong, Seoul (KR); Seunghak Lee, Seoul (KR); Eun-Ju Kim, Seoul (KR); Jae Shik Chung, Seoul (KR); Hien Thi Nguyen, Seoul (KR); Youngjae Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 59 days.

(21) Appl. No.: 16/677,679

(22) Filed: Nov. 8, 2019

(65) Prior Publication Data

US 2020/0325043 A1 Oct. 15, 2020

(30) Foreign Application Priority Data

Apr. 11, 2019 (KR) .................. 10-2019-0042346

(51) Int. Cl.
*C02F 1/52* (2006.01)
*E03B 3/34* (2006.01)
*C02F 101/32* (2006.01)
*C02F 1/00* (2006.01)

(52) U.S. Cl.
CPC .............. *C02F 1/5263* (2013.01); *E03B 3/34* (2013.01); *C02F 1/001* (2013.01); *C02F 2101/32* (2013.01)

(58) Field of Classification Search
CPC .................................................. C02F 1/5236
See application file for complete search history.

(56) References Cited

U.S. PATENT DOCUMENTS

2010/0230363 A1 9/2010 Gong et al.

FOREIGN PATENT DOCUMENTS

| KR | 101262244 B1 | 5/2013 |
| KR | 101334266 B1 | 11/2013 |
| KR | 101795430 B1 | 11/2017 |
| KR | 101837300 B1 | 3/2018 |

OTHER PUBLICATIONS

Brad Lingvai, "Aquifer Storage: A Promising Part of Texas Water Solutions," Big Red Dog, Aug. 2014, 3 pages, http://bigreddog.com/aquifer-storage-a-promising-part-of-texas-water-solutions.

Chris Austin, "Maven's Minutes: Water storage, part 2: A look at California's successful groundwater management and banking programs," Maven's Notebook, Sep. 3, 2013, 13 pages, https://mavensnotebook.com/2013/09/03/mavens-minutes-water-storage-part-2-how-groundwater-banking-is-done-a-look-at-three-successful-operations.

Koen Zuurbier et al., "Improved ASR-Coastal Reference sites (TRL8)," SUBSOL, 2017, pp. 1-90.

Peng Tang et al., "Assimilable organic carbon (AOC) determination using GFP-tagged Pseudomonas fluorescens P-17 in water by flow cytometry," PLOS ONE, 2018, 12 pages, vol. 13, No. 6.

*Primary Examiner* — Peter Keyworth
(74) *Attorney, Agent, or Firm* — Cantor Colburn LLP

(57) ABSTRACT

The present invention is an aquifer storage and recovery system using a natural coagulant, in which in purifying raw water through aquifer storage and recovery, assimilable organic carbon (AOC) included in the raw water is effectively removed using a natural coagulant produced in the aquifer storage and recovery process, thereby reducing the time required to purify raw water by aquifer storage and recovery.

3 Claims, 1 Drawing Sheet

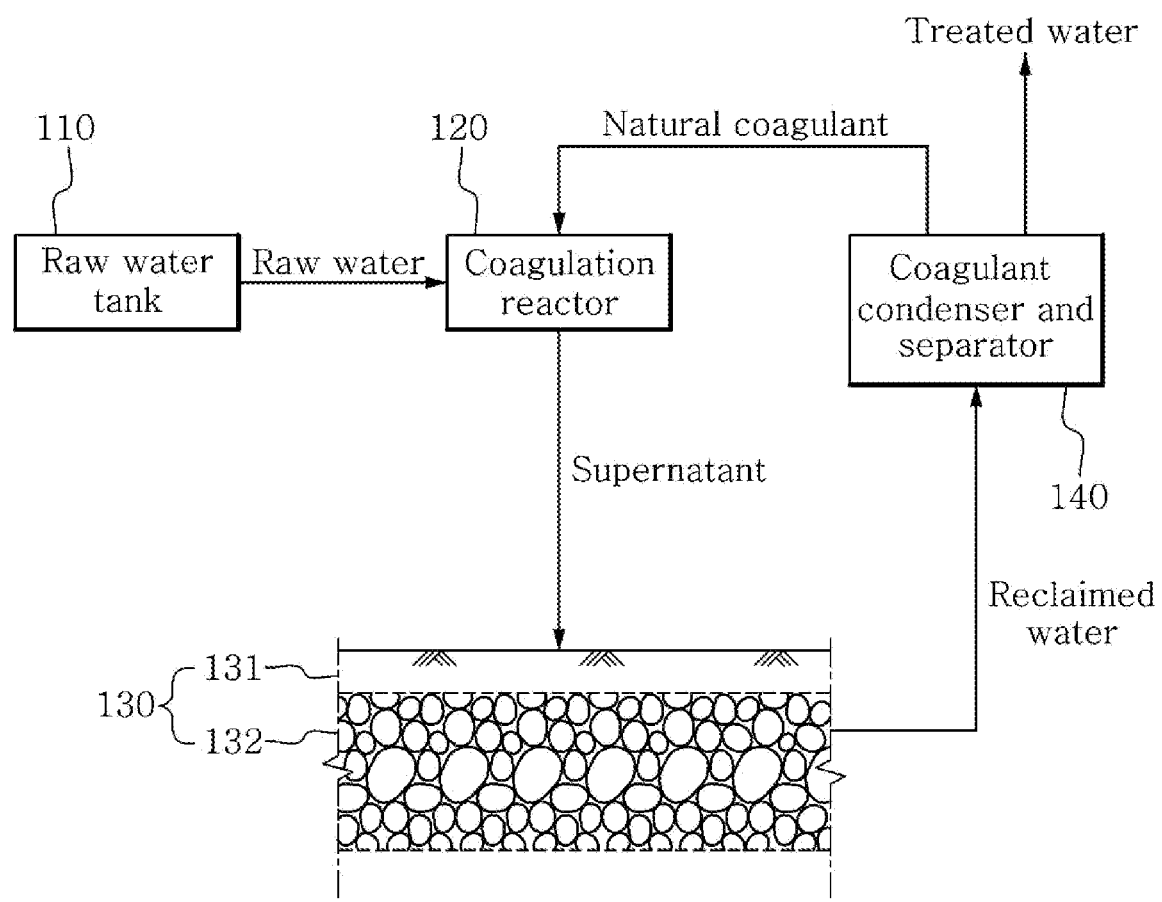

AQUIFER STORAGE AND RECOVERY SYSTEM USING NATURAL COAGULANT

CROSS-REFERENCE TO RELATED APPLICATION

This application claims priority to Korean Patent Application No. 10-2019-0042346, filed on Apr. 11, 2019, and all the benefits accruing therefrom under 35 U.S.C. § 119, the contents of which in its entirety are herein incorporated by reference.

BACKGROUND

1. Field

The present disclosure relates to an aquifer storage and recovery system using a natural coagulant, and more particularly, to an aquifer storage and recovery system using a natural coagulant, in which in purifying raw water through aquifer storage and recovery, assimilable organic carbon (AOC) included in the raw water is effectively removed using a natural coagulant produced in the aquifer storage and recovery process, thereby reducing the time required to purify raw water by aquifer storage and recovery.

2. Description of the Related Art

Aquifer storage and recovery injects rainwater, surface water or sewage treated water into an underground aquifer, and if necessary, recovers and uses it, and can be used to store water for dry season water supplies and purify water by removing pollutants during long-term storage. When aquifer storage and recovery is used for water purification, aquifer storage and recovery is used for the purpose of pre-treatment of a water purification process or purification of recycled water produced by advanced treatment of wastewater.

According to the research results in the Netherlands, it is known that assimilable organic carbon (AOC) used as a main source of carbon for microbe growth is reduced to 10 µg/L or less while raw water injected is stored in the underground aquifer in the long term. When assimilable organic carbon is reduced and microbe growth is suppressed, chemical disinfection such as chlorination is not required. When chemical disinfection is excluded from a water treatment process, it is possible to save costs and avoid disinfection by-products resulting from chemical disinfection treatment, thereby improving the quality of treated water.

While the fact that assimilable organic carbon is reduced when stored long-term in the underground aquifer is found, the mechanism of assimilable organic carbon removal is not yet clearly defined. In the common water treatment process, a costly pre-treatment process is applied to remove assimilable organic carbon.

RELATED LITERATURES

Patent Literatures (Patent Literature 1) Korean Patent No. 1334266

SUMMARY

The present disclosure is designed to solve the above-described problem, and therefore the present disclosure is directed to providing an aquifer storage and recovery system using a natural coagulant, in which in purifying raw water through aquifer storage and recovery, assimilable organic carbon (AOC) included in the raw water is effectively removed using a natural coagulant produced in the aquifer storage and recovery process, thereby reducing the time required to purify raw water by aquifer storage and recovery.

To achieve the above-described object, an aquifer storage and recovery system using a natural coagulant according to the present disclosure includes a coagulation reactor which mixes and agitates a natural coagulant and raw water to induce floc formation, and precipitates the generated flocs to remove assimilable organic carbon and organic matter included in the raw water, an aquifer storage and recovery tank which is supplied with supernatant of the coagulation reactor and stores reclaimed water through an aquifer storage and recovery process, and a coagulant condenser and separator which separates the reclaimed water of the underground aquifer into treated water and the natural coagulant, wherein a fine metal particle present in a permeable layer is dissolved in the supernatant in a form of a metal ion while the supernatant of the coagulation reactor passes through the permeable layer of the aquifer storage and recovery tank, and the metal ion included in the reclaimed water is separated as the natural coagulant by the coagulant condenser and separator, and the natural coagulant separated by the coagulant condenser and separator is fed into the coagulation reactor.

The natural coagulant separated by the coagulant condenser and separator may be in a form of solid-phase metal hydride or in a condensed form containing dissolved metal ion.

The metal ion that constitutes the natural coagulant may be any one of an iron ion, an aluminum ion, a copper ion, a manganese ion and a cobalt ion or their mixtures.

The aquifer storage and recovery system using a natural coagulant according to the present disclosure has the following effects.

In purifying raw water using aquifer storage and recovery, in addition to the assimilable organic carbon reduction effect by aquifer storage and recovery, it is possible to additionally reduce assimilable organic carbon by using a cationic metal ion produced in the aquifer storage and recovery process as a natural coagulant, thereby effectively removing assimilable organic carbon included in the raw water and reducing the time required to remove assimilable organic carbon.

BRIEF DESCRIPTION OF THE DRAWINGS

FIGURE is an architecture diagram of an aquifer storage and recovery system using a natural coagulant according to an embodiment of the present disclosure.

DETAILED DESCRIPTION

Technology that effectively removes assimilable organic carbon (AOC) and other organic matter in raw water using aquifer storage and recovery is proposed herein.

As mentioned above in the 'Related art', when raw water spends a long time using aquifer storage and recovery, the concentration of assimilable organic carbon in the raw water is reduced. However, a very long residence time is required, and the residence time may be prolonged according to the characteristics of the raw water.

The present disclosure discloses technology that purifies raw water using aquifer storage and recovery, in which in addition to the assimilable organic carbon reduction effect by aquifer storage and recovery, assimilable organic carbon is additionally reduced by using a natural coagulant produced in the aquifer storage and recovery process, thereby effectively removing assimilable organic carbon included in the raw water and reducing the time required to remove assimilable organic carbon.

In the present disclosure, the natural coagulant is produced in the aquifer storage and recovery process. The aquifer storage and recovery process refers to a process in which raw water is stored in the underground aquifer through the permeable layer, and while raw water passes through the permeable layer of the Earth surface, a metal ion included in the permeable layer, for example, an iron ion, an aluminum ion, a copper ion, a manganese ion and a cobalt ion, is dissolved in the raw water and moved to the underground aquifer together with the raw water. Accordingly, reclaimed water stored in the underground aquifer includes the metal ion derived from the permeable layer, for example, an iron ion, an aluminum ion, a copper ion, a manganese ion and a cobalt ion.

The present disclosure proposes technology that removes assimilable organic carbon of raw water by using a metal ion included in reclaimed water as a natural coagulant.

Hereinafter, an aquifer storage and recovery system using a natural coagulant according to an embodiment of the present disclosure will be described in detail with reference to the accompanying drawings.

Referring to FIGURE, the aquifer storage and recovery system using a natural coagulant according to an embodiment of the present disclosure includes a raw water tank 110, a coagulation reactor 120, an aquifer storage and recovery tank 130 and a coagulant condenser and separator 140. Raw water of the raw water tank 110 is produced as treated water through the coagulation reactor 120, the aquifer storage and recovery tank 130 and the coagulant condenser and separator 140 in a sequential order.

The raw water tank 110 stores raw water therein, and the raw water may be any one of surface water, rainwater, freshwater containing pollutants and advanced treated wastewater, or their mixtures.

The coagulation reactor 120 serves to coagulate and remove assimilable organic carbon and other organic matter included in the raw water by using a natural coagulant. The natural coagulant is produced in the aquifer storage and recovery process in the aquifer storage and recovery tank 130 at the rear end, and the natural coagulant is separated through the coagulant condenser and separator 140 and the natural coagulant separated by the coagulant condenser and separator 140 is supplied to the coagulation reactor 120. The natural coagulant produced through the aquifer storage and recovery tank 130 and the coagulant condenser and separator 140 includes a metal ion, for example, an iron ion, an aluminum ion, a copper ion, a manganese ion and a cobalt ion. The production and separation of the natural coagulant will be described in detail below.

When the raw water is supplied from the raw water tank 110, the coagulation reactor 120 mixes and agitates the raw water and the natural coagulant to induce flocs formation, and causes reaction leading to precipitation of the generated flocs to remove assimilable organic carbon included in the raw water. While being mixed and agitated with the raw water, the natural coagulant which is a cationic metal ion is bonded with assimilable organic carbon and other organic matter included in the raw water to form flocs, and the generated flocs are precipitated on the bottom of the coagulation reactor 120 through natural sedimentation. The assimilable organic carbon and other organic matter included in the raw water may be removed through coagulation and precipitation reaction in the coagulation reactor 120. The coagulation reactor 120 may be a single reactor, or a combination of a coagulation and agitation tank and a precipitation tank. When the coagulation and precipitation reaction in the coagulation reactor 120 are completed, supernatant of the coagulation reactor 120 is supplied to the aquifer storage and recovery tank 130.

The aquifer storage and recovery tank 130 serves to produce reclaimed water through the aquifer storage and recovery process. The aquifer storage and recovery tank 130 may use a common aquifer storage and recovery system. In an embodiment, the aquifer storage and recovery tank 130 may include a combination of a permeable layer 131 and an underground aquifer 132. The aquifer storage and recovery process is a process in which supernatant of the coagulation reactor 120 is stored in the underground aquifer 132 through the permeable layer 131, and the organic matter included in supernatant of the coagulation reactor 120 is filtered out by the permeable layer 131 while the supernatant of the coagulation reactor 120 passes through the permeable layer 131.

Meanwhile, fine particles of metal present in the permeable layer 131, for example, iron, aluminum, copper, manganese and cobalt are dissolved in the supernatant of the coagulation reactor 120 while the supernatant of the coagulation reactor 120 passes through the permeable layer 131. Accordingly, a metal ion, for example, an iron ion, an aluminum ion, a copper ion, a manganese ion and a cobalt ion is dissolved in the reclaimed water of the underground aquifer 132. The present disclosure refers to the metal ion from the permeable layer 131 as a natural coagulant, and uses it as a coagulant of the coagulation reactor 120.

The coagulant condenser and separator 140 is a device that separates the reclaimed water of the underground aquifer 132 into treated water and the natural coagulant to produce treated water, and condenses and separates the natural coagulant. Because the coagulant condenser and separator 140 is a device that separates the natural coagulant from the reclaimed water to produce treated water, devices of various principles may be applied. In detail, the coagulant condenser and separator 140 of any one of precipitation, filtration and evaporation types may be applied. When the coagulant condenser and separator 140 of filtration type is applied, various types of filtration devices that can filter a metal ion, for example, any one of a nanofiltration device, a reverse osmosis membrane device, a forward osmosis membrane device and a membrane distillation device may be used. When the coagulant condenser and separator 140 of evaporation type is applied, the treated water and the natural coagulant may be separated by heating the reclaimed water to 100° C. or higher, or reducing the pressure of the reclaimed water. Additionally, when the concentration of the natural coagulant in the reclaimed water is high, the coagulant condenser and separator 140 may include a microfiltration membrane, an ultrafiltration membrane, etc.

The natural coagulant separated by the coagulant condenser and separator 140 may be in the form of solid-phase metal hydride or in a condensed form containing dissolved metal ion. When the coagulant condenser and separator 140 is formed of filtration type, the natural coagulant is in a condensed form containing dissolved metal ion, and when the coagulant condenser and separator 140 is formed of evaporation type, the natural coagulant is in the form of metal hydride.

The natural coagulant derived from the permeable layer 131 in the aquifer storage and recovery process and separated by the coagulant condenser and separator 140 is fed into the coagulation reactor 120, and assimilable organic carbon included in the raw water by coagulation and precipitation reaction in the coagulation reactor 120 is coagulated and removed in the form of flocs by bonding with the natural coagulant.

Although not shown in the drawings, a borehole and a pump may be provided on one side of the aquifer storage and recovery tank 130 to supply the reclaimed water of the underground aquifer 132 to the coagulant condenser and separator 140, and a pump may be provided on one side of the coagulation reactor 120 to supply the supernatant of the coagulation reactor 120 to the aquifer storage and recovery tank 130.

DETAILED DESCRIPTION OF MAIN ELEMENTS

| | |
|---|---|
| 110: Raw water tank | 120: Coagulation reactor |
| 130: Aquifer storage and recovery tank | 131: Permeable layer |
| 132: Underground aquifer | 140: Coagulant condenser and separator |

What is claimed is:

1. An aquifer storage and recovery system using a natural coagulant, comprising:
    a coagulation reactor which mixes and agitates a natural coagulant and raw water to induce formation of flocs, and deposits the flocs to remove assimilable organic carbon (AOC) and organic matter included in the raw water;
    an aquifer storage and recovery tank which comprises a permeable layer and an underground aquifer, is supplied with supernatant of the coagulation reactor and stores reclaimed water through an aquifer storage and recovery process; and
    a coagulant condenser and separator which separates the reclaimed water of the underground aquifer into treated water and the natural coagulant,
    wherein a fine metal particle present in the permeable layer is dissolved in the supernatant in a form of a metal ion while the supernatant of the coagulation reactor passes through the permeable layer of the aquifer storage and recovery tank, and
    the metal ion included in the reclaimed water is separated as the natural coagulant by the coagulant condenser and separator, and the natural coagulant separated by the coagulant condenser and separator is fed into the coagulation reactor.

2. The aquifer storage and recovery system using a natural coagulant according to claim 1, wherein the natural coagulant separated by the coagulant condenser and separator is in a form of solid-phase metal hydride or in a condensed form containing dissolved metal ion.

3. The aquifer storage and recovery system using a natural coagulant according to claim 1, wherein the metal ion that constitutes the natural coagulant is any one of an iron ion, an aluminum ion, a copper ion, a manganese ion and a cobalt ion or their mixtures.

* * * * *